United States Patent [19]

Dewhurst et al.

[11] Patent Number: 5,358,985
[45] Date of Patent: Oct. 25, 1994

[54] IONIC SILOXANE AS INTERNAL MOLD RELEASE AGENT FOR POLYURETHANE, POLYURETHANEUREA AND POLYUREA ELASTOMERS

[75] Inventors: John E. Dewhurst; Ronald M. Pearlstein, both of Macungie, Pa.

[73] Assignee: Air Products and Chemicals, Inc., Allentown, Pa.

[21] Appl. No.: 992,360

[22] Filed: Dec. 16, 1992

[51] Int. Cl.$^5$ ............................... C08K 5/20
[52] U.S. Cl. .................... 524/233; 524/114; 524/252; 524/265; 524/589; 524/590
[58] Field of Search ............ 524/265, 233, 252, 114, 524/589, 590

[56] References Cited

U.S. PATENT DOCUMENTS

| | | | |
|---|---|---|---|
| 4,040,992 | 8/1977 | Bechara | 260/2.5 AN |
| 4,076,695 | 2/1978 | Kell | 260/77.5 |
| 4,379,100 | 4/1983 | Salisbury et al. | 264/39 |
| 4,396,729 | 8/1983 | Dominguez | 521/51 |
| 4,420,570 | 12/1983 | Dominguez | 521/112 |
| 4,472,341 | 9/1984 | Alberino et al. | 264/300 |
| 4,477,366 | 10/1984 | Robertson | 252/182 |
| 4,487,912 | 11/1984 | Zimmerman et al. | 528/52 |
| 4,585,803 | 4/1986 | Nelson et al. | 521/105 |
| 4,764,540 | 8/1988 | Dewhurst et al. | 521/110 |
| 4,789,688 | 12/1988 | Dewhurst et al. | 521/110 |
| 5,043,409 | 8/1991 | Lammerting et al. | 528/31 |

*Primary Examiner*—Melvyn I. Marquis
*Assistant Examiner*—Mark Sweet
*Attorney, Agent, or Firm*—Michael Leach; James C. Simmons; William F. Marsh

[57] ABSTRACT

In an active hydrogen-containing B-side composition for reaction with a polyisocyanate-containing A-side composition to make a polyurethane or polyurethaneurea elastomer by reaction injection molding, the improvement which comprises a mold release composition which is the reaction product of triethylenediamine and a $C_2$–$C_{21}$ epoxide reacted in the presence of a carboxy functional siloxane.

16 Claims, No Drawings

500

IONIC SILOXANE AS INTERNAL MOLD RELEASE AGENT FOR POLYURETHANE, POLYURETHANEUREA AND POLYUREA ELASTOMERS

FIELD OF THE INVENTION

The present invention relates to internal mold release compositions for use in the reaction injection molding of elastomeric articles.

BACKGROUND OF THE INVENTION

Reaction injection molding (RIM) is a versatile process by which elastomeric and thermoset parts can be fabricated. The RIM process involves high pressure impingement mixing of a polyisocyanate stream (A-side) and an active-hydrogen containing isocyanate-reactive stream (B-side) followed by immediate injection into the closed mold. The primary appeal of this process lies in its inherently high productivity. One factor which limits productivity, however, is the necessity to spray the molds with external mold release prior to each injection. This is a time-consuming task and often has a negative environmental impact. This difficulty can be overcome by the incorporation of an internal release agent into the formulation via one of the two streams to significantly increase the number of molding cycles which can be accomplished between mold release sprayings.

The use of metallic soaps as release agents has been known for a long time. Zinc stearate, in particular, is known to be soluble in aliphatic amines, such as the polyether polyamines and ethylenediamine-initiated polyols. This is the basis for its use as an internal mold release (IMR) agent in RIM. If zinc stearate is simply dispersed as a fine powder in polyol blends, it does not dissolve and does not act as a release agent. Various patents teach that zinc soaps can be compatibilized or dissolved in polyol blends with amines, enamines, kerimines or salts of amidines or guanidines, and that excellent releasability of the subsequent RIM parts will result.

While the IMR approach is commercially applied, there remains significant shortcomings to the currently available IMR systems. The amine-solubilized metallic soaps, which are most commonly used in this application, have been implicated in reactivity and/or physical property deficiencies for the RIM elastomers in which they are used. Furthermore, the high melting points and limited solubilities of the metallic soaps make them prone to precipitation in the RIM processing equipment, necessitating replacement of the piping regularly.

The search for IMR agents which are liquids without the possibility of solidifying led to the development of special silicone fluids for this application. U.S. Pat. No. 4,076,695 discloses certain carboxy-functional silicone fluids as IMR agents for RIM, including Dow Corning's commercial carboxy-functional silicone fluid Q2-7119, which has the following general formula:

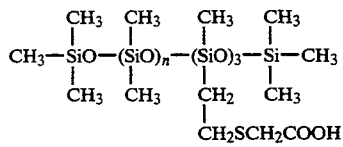

Average Mol Wt - 7500

Average Eq Wt - 2500

In general, acids have a deleterious effect on the green strength of aryldiamine-extended polyurethaneurea RIM systems due to a general deactivation of the tin catalyst. Thus, higher than normal levels of tin catalysts are needed when acids are present. Due to the sulfur atom, alpha to the carbonyl group, Q2-7119 is a much stronger acid than a typical fatty acid, such as lauric acid. Therefore, when T-12 (dibutyltin dilaurate) and Q2-7119 are in the same polyol blend, the equilibrium reaction involving the two components leads to a gelled silicone salt. This gelation results from a cross-linking reaction between the trifunctional silicone and the difunctional tin salt. The result is that the system exhibits extremely poor green strength which cannot be corrected by the addition of more tin catalyst.

Attempts to dissolve this problem include the following:

U.S. Pat. No. 4,379,100 discloses the use of a 3-stream approach to RIM molding where the Q2-7119 is delivered dispersed in polyol containing no tin catalyst. The other two streams are the normal A and B sides of RIM technology. The A side is isocyanate and the B side is a blend of polyol, diamine chain extender, surfactants and tin and amine catalysts.

U.S. Pat. No. 4,420,570 discloses that the tin catalyst can be placed in the A side. Gelation is avoided, but high levels of catalysts are still needed for adequate green strength. Furthermore, placing the tin catalyst in the isocyanate increases the moisture sensitivity and susceptibility to side reactions, such as allophonate formation, leading to gelation of the isocyanate.

U.S. Pat. No. 4,396,729 discloses replacing the polyether polyol and the tin catalyst with polyether polyamines which require no tin catalyst. The result is polyurea RIM, and Q2-7119 can be used with no chemical modification or 3-stream approach.

U.S. Pat. No. 4,472,341 discloses that the acid groups on Q2-7119 can be converted to amides by reaction with amines or to esters by reaction with alcohols or epoxides yielding nonacidic IMR silicones. These materials have been shown to cause paintability problems. In addition, they have been seen to interfere with polyol nucleation so that low part densities cannot be achieved. In extreme cases, large voids are found in the parts due to coalescence of bubbles.

U.S. Pat. No. 4,477,366 discloses that Q2-7119 can be dispersed on the isocyanate side by using a nonisocyanate-reactive silicone as a dispersing and inhibiting agent.

U.S. Pat. No. 4,487,912 discloses the use of the reaction products of fatty cyclic anhydrides with primary or secondary amines, including distearylamine.

U.S. Pat. No. 4,585,803 discloses that salts of Q2-7119 can be made with Group IA, IB, IIA, IIB, aluminum, chromium, molybdenum, iron, cobalt, nickel, tin, lead, antimony or bismuth. These salts are then compatibilized in the B-side blend with certain tertiary amines. In practice, these salts are extremely viscous or gelatinous in nature and do not disperse well into the polyol.

U.S. Pat. No. 4,764,540 and 4,789,688 disclose that salts of Q2-7119 can be made with amidines and guanidines, such as tetramethyl-guanidine, to yield neutralized forms of the silicone which would not gel tin catalysts. Waxy amidines such as the imidazolines from stearic acid and ethylenediamine derivatives were cited as particularly efficacious for release.

U.S. Pat. No. 4,040,992 discloses the use of N-hydroxyalkyl quaternary ammonium carbonylate salts as catalysts in the production of polyisocyanurates and polyurethanes. Among the exemplary preferred catalysts are N-hydroxypropyl trimethyl ammonium salts of carboxylic acids such as those of formic and acetic acids and of fatty acids such as hexanoic and octanoic acids and the like.

SUMMARY OF THE INVENTION

The present invention is directed to a method for making a polyurethane, polyurethaneurea or polyurea elastomer in which a reactive mixture is formed in a mold cavity and cured. The reactive mixture contains polyol, organic polyisocyanate, urethane catalyst, optionally a diol and/or diamine chain extender, and a mold release additive. The present invention provides as the internal mold release (IMR) additive a composition consisting essentially of the reaction product of a tertiary amine, such as triethylenediamine (TEDA), with an epoxide reacted in the presence of a carboxy functional siloxane.

The resulting compositions are ionic siloxanes which function as IMR agents that do not gel tin catalysts. In some cases, normal tin catalyst levels can be used.

Another embodiment of the invention is a polyol-containing B-side composition for reaction with a polyisocyanate-containing A-side composition. The B-side composition consists essentially of a polyol, urethane catalyst, the IMR additive, optionally a diol and/or diamine chain extender, and silicone surfactant.

DETAILED DESCRIPTION OF THE INVENTION

The present invention is directed to an IMR composition for use in a molding process, an isocyanate-reactive composition containing the IMR composition, and the use of the IMR composition in a molding process.

The IMR composition consists essentially of the reaction product of a mixture of TEDA and a $C_2$-$C_{21}$ reactive epoxide, preferably in substantially stoichiometric amounts. This mixture is reacted in the presence of a carboxy functional siloxane as taught in U.S. Pat. No. 4,076,695 which disclosure is incorporated by reference. The amount of the reaction product of TEDA and the epoxide relative to the carboxy functional siloxane is that amount which is effective to prevent the gelation with the tin catalyst. While this depends upon the carboxylate equivalent weight of the quaternary salt, the nominal range is a 3:1 to 1:3, preferably a 1:1, weight ratio.

Exemplary of suitable $C_2$-$C_{21}$ reactive epoxides are the simple monoepoxides such as ethylene oxide, propylene oxide, butylene oxide, styrene oxide and the like; glycidyl ethers including those of $C_{12}$-$C_{18}$ higher alcohols, simple $C_2$-$C_{18}$ glycols or bisphenols; silicone containing epoxides such as Dow Corning's Z-6040; and epoxidized olefins such as Poly bd 600 and 605 from Atochem or epoxidized vegetable oils. It is preferred to use propylene oxide or the monoglycidyl ether of a higher alcohol. Suitable higher alcohols include lauryl, myristyl, cetyl, and stearyl alcohols.

In general, suitable carboxy functional siloxanes consist essentially of from 0.5 to 20 mole % of $R_a R'_b SiO_{4-a-b/2}$ units and from 80 to 99.5 mole % of $R''_c SiO_{4-c/2}$ units wherein R is a carboxy functional radical,
R' is a hydrocarbon or substituted hydrocarbon radical,
R" is a hydrocarbon or substituted hydrocarbon radical,
a has an average value of from 1 to 3,
b has an average value of from 0 to 2,
a+b is from 1 to 3, and
c has an average value of from 0 to 3.

The preferred siloxane has the following general formula:

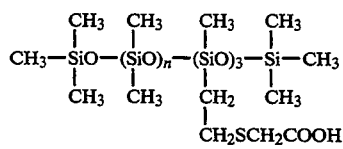

The most preferred carboxy functional siloxane is Q2-7119 from Dow Corning Corporation which has
Average Mol Wt-7500
Average Eq Wt-2500

The IMR compositions may generally be prepared by first heating the tertiary amine and reactive epoxide together at $\geq 70°$ C. in the presence of the carboxy functional siloxane until the epoxide band at 916 cm$^{-1}$ is absent from the infrared spectrum. Although the tertiary amine, reactive epoxide and carboxy functional siloxane components may be present in various relative amounts, it is preferred to use substantially stoichiometric amounts of the components.

The IMR compositions resulting from the reaction are suitable for use with either flexible or rigid, optionally cellular, polyurethane or polyurethane/urea elastomers. The molded articles may possess various combinations of these properties such as rigid, non-cellular elastomers or flexible, cellular products for use, for example, as shoe soles.

The IMR composition is used in an amount sufficient to effect release of the molded article from the mold surfaces. A suitable amount would be 0.5 to 10 wt %, preferably 3 to 5 wt %, based on the B-side, or isocyanate-reactive, composition comprising at least one high molecular weight active hydrogen containing compound, amine and/or metallic urethane catalyst, optionally a diol or diamine chain extender, and silicone surfactant. The reaction mixture is preferably processed at an isocyanate index of from 70 to 130.

Suitable polyisocyanates for use in the present invention are aliphatic, cycloaliphatic, araliphatic and aromatic polyisocyanates which are well known in the art. Specific examples include ethylene diisocyanate, 1,4-tetramethylene diisocyanate, 1,6-hexamethylene diisocyanate, cyclohexane-1,3- and 1,4-diisocyanate and isophorone diisocyanate. Typical aromatic polyisocyanates include phenylene diisocyanate, toluene diisocyanate and 4,4'-diphenylmethane diisocyanate. Especially suitable are the 2,4- and 2,6-toluene diisocyanates individually or together as their commercially available mixtures. Other especially suitable mixtures of diisocyanates are those known commercially as "crude MDI" also known as "PAPI", which contain about 60% of 4,4'-diphenylmethane diisocyanate along with other isomeric analogous higher polyisocyanates. Also suitable are prepolymers of these polyisocyanates comprising a partially prereacted mixture of polyisocyanate and polyether or polyester polyols disclosed hereinafter.

The polyether polyols useful in the invention include primary and secondary hydroxyl-terminated polyether polyols greater than 500 average molecular weight having from 2 to 6 functionality, preferably from 2 to 3, and a hydroxyl equivalent weight of from 250 to about 2500. Mixtures of polyether polyols may be used.

The polyether polyols are made from an appropriate initiator to which lower alkylene oxides such as ethylene oxide, propylene oxide, butylene oxide or mixtures thereof are added resulting in hydroxyl-terminated polyols. When two or more oxides are used, they may be present as random mixtures or as blocks of one or the other polyether. Thus the polyalkylene ether polyols include the poly(alkylene oxide) polymers, such as poly(ethylene oxide) and poly(propylene oxide) polymers and copolymers with a terminal hydroxyl group derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and tri-functional materials and/or different molecular weight or different chemical composition materials may be used.

Useful polyester polyols include those produced by reacting a carboxylic acid with an excess of a diol; for example, adipic acid with ethylene glycol or butane diol, or a lactone with an excess of a diol, such as caprolactone and propylene glycol.

Illustrative of suitable hydroxyl group-containing chain extenders are ethylene glycol, propylene glycol, butane diols, 1,6-hexane diol, diethylene glycol, triethylene glycol, tetraethylene glycol, dipropylene glycol, tripropylene glycol, glycerol and trimethylol propane.

The aromatic diamine chain extender is useful in this invention include for example, 1-methyl-3,5-diethyl-2,4-diaminobenzene; 1-methyl-3,5-diethyl-2,6-diaminobenzene (both these materials are also called diethyltoluenediamine or DETDA); 1,3,5-triethyl-2,6-diaminobenzene; 2,4-dimethyl-6-t-butyl-3,5-diaminobenzene; 3,5,3',5'-tetraethyl-4,4'-diaminodiphenylmethane; 1-methyl-3-t-butyl-2,4-diaminobenzene; 1-methyl-5-t-butyl-2,6-diaminobenzene (both these materials are also called t-butyl toluenediamine or TBTDA) and the like. Particularly preferred aromatic diamine chain extenders are DETDA and TBTDA. It is within the scope of the invention to include some aliphatic chain extender materials as described in U.S. Pat. No. 4,246,363 and 4,269,945.

Urethane catalysts include amine and tin catalysts well known in the art such as for example, triethylenediamine and dibutyltin dilaurate. Suitable amounts of catalyst may range from about 0.025 to 0.3 parts, preferably 0.05 to 0.2 parts, per 100 parts per weight polyol in the elastomer composition.

Other conventional ingredients may be employed as needed, such as, for example, foam stabilizers, also known as silicone oils or surfactants and reinforcing materials.

The compositions according to the present invention may be molded using conventional processing techniques and are especially suited for processing by the RIM process. In general, two separate streams are intimately mixed and subsequently injected into a suitable mold, although it is possible to use more than two streams. The first stream contains the polyisocyanate component, while the second stream contains the polyol component, urethane catalyst, chain extender, the internal mold release composition and any other additive which is to be included.

In the examples, the following ingredients were used:

Multranol 3901—A glycerin-initiated polyoxyalkylene polyether triol having a hydroxyl number of 28 from Mobay Corporation.

Multranol 9139—A glycerin-initiated polyoxyalkylene polyether triol having a hydroxyl number of 28 from Mobay Corporation.

tBTDA—an 80/20 mixture of 5-tertbutyl-2,4-toluenediamine and 5-tertbutyl-2,6-toluenediamine.

DC 198—a silicone surfactant from Air Products and Chemicals, Inc.

T-12—dibutyltin dilaurate from Air Products and Chemicals, Inc.

DABCO 33LV ®—a 33% solution of triethylenediamine in a glycol carrier from Air Products and Chemicals, Inc.

Mondur PF—4,4'-diphenylmethanediisocyanate which has been liquified by reaction with a low molecular weight glycol to an NCO content of about 22.6% from Mobay Corporation.

Airthane ® PPT 95A—an isocyanate-terminated polypropylene glycol prepolymer with toluenediisocyanate having a nominal 6.1% NCO content, from Air Products and Chemicals, Inc.

EXAMPLE 1

16.8 grams of DABCO ® TEDA crystal were dissolved in 250 grams of Q2-7119 carboxy functional silicone from Dow Corning Corp. with stirring at 80° C. To this was added 45 grams of Epodil 748 glycidyl ether of lauryl alcohol. As the reaction occurred, an exotherm to 100° C. was noted. The mixture was stirred for three hours at 80° C., after which time the reaction was judged to be over.

EXAMPLE 2

The adhesion test, which was used to quantify the performance of the various IMR candidates, was based on the ASTM standard method D429B, "90° Stripping Test". The mold, which has six wells with dimensions $6 \times 1 \times 5/16$ inch ($15.24 \times 2.54 \times 0.80$ cm), is coated with external mold release. A steel coupon with dimensions $1 \times 2.5$ inch ($2.54 \times 6.35$ cm) is thoroughly cleaned of corrosion and contamination with a Scotch-brite pad, then polished with grade 00 steel wool. The coupon is then rinsed under a stream of toluene and oven-dried. Both ends of the coupon are masked with pieces of ¾ inch (1.91 cm) transparent tape to provide a 1 in² (6.45 cm²) bare steel surface for bonding, then placed in one end of the mold. Typically, five coupons are prepared simultaneously in this manner. The masked compounds in the mold are then tempered in a 70° C. oven.

A 2:1 (w/w) curative mixture is prepared with Multranol 3901 polyol and XCE-89 (tBTDA) chain extender. The T-12 catalyst is then added at a concentration of 0.1% by weight. For the test, 53.8 g of this blend is weighed into a 12 oz (355 ml) paper cup and heated to 70° C. The IMR (2.7 g) is then blended with the curative. Airthane ® PPT-95A isocyanate-terminated prepolymer (150 g) is then weighed into the resulting mixture.

The polyurethane/urea mixture is blended for 10 seconds with a Dispersator (Premier Mill Corp.) fitted with a 1 inch (2.54 cm) duplex head, then immediately poured into the prepared mold. A woven backing with 0.25 inch (0.65 cm) spacings is placed on top of the cast mixture to prevent elongation of the part during testing. The casting is cured at 70° C. for 30 minutes and carefully demolded. The masked regions of the coupon are gently released from the elastomer, providing a means of connecting the coupon to the Instron tester. Any elastomer which laps over the side of the coupon is trimmed with a razor-knife. The opposite end of the casting is attached to the upper pneumatic jaw of the Instron. The distance between the coupon and the upper jaw of the Instron is set to 3.5%. A cross-head speed of 0.2 inch/min (0.51 cm/min) is used during the force vs. displacement measurement. The area under the curve and the peak force are noted.

The above adhesion test was conducted on the base system with and without Example 1 IMR additive. The results are shown in Table 1.

TABLE 1

|  | Peel Force (per linear inch width) | Peel Energy (per square inch bonded area) |
|---|---|---|
| No IMR | 4.7 lb (2132 g) | 2.8 lb-in (3.23 g-cm) |
| 2.7 grams of Example 1 | 1.23 lb (558 g) | 0.62 lb-in (0.714 g-cm) |

All RIM parts were made on a Battenfeld SHK 14 Piston Metering RIM machine. Plaques weighing 128 grams (including the aftermixer and runner) were made using a stainless steel mold sprayed with ChemTread RCTW-2006 external mold release (EMR). One face of the plaque mold was treated with EMR prior to each shot while the other was treated prior only to the first shot. A system with no EMR agent gives 5 to 7 shots before severe sticking and delamination takes place. A system with at least fifteen releases before such sticking was judged to be releasing well.

EXAMPLE 3

The RIM system shown in Table 2 was run according to the procedure outlined above, with the release results shown in Table 2.

TABLE 2

|  | Parts |
|---|---|
| Multranol 9139 | 78 |
| tBTDA | 18 |
| DC 198 | 0.8 |
| Dabco 33 LV | 0.1 |
| T-12 | 0.1 |
| Example 1 IMR | 3 |
| Mondur PF | 47 |
| Still releasing easily after 15 parts | |

STATEMENT OF INDUSTRIAL APPLICATION

An internal mold release composition is provided for making reaction injection molded polyurethane, polyurethaneurea and polyurea articles.

We claim:

1. In an active hydrogen-containing B-side composition for reaction with a polyisocyanate-containing A-side composition to make a polyurethane, polyurethaneurea or polyurea elastomer by reaction injection molding, the improvement which comprises a mold release composition consisting essentially of the reaction product of triethylenediamine and a $C_2-C_{21}$ epoxide reacted in the presence of a carboxy functional siloxane.

2. The B-side composition of claim 1 in which the epoxide is ethylene oxide, propylene oxide, butylene oxide, styrene oxide, a glycidyl ether of a $C_{12}-C_{18}$ higher alcohol, a $C_2-C_{18}$ glycol or a bisphenol; a silicone containing epoxide, an epoxidized olefin or an epoxidized vegetable oil.

3. The B-side composition of claim 1 in which the epoxide is propylene oxide or a monoglycidyl ether of a $C_{12}-C_{18}$ alcohol.

4. The B-side composition of claim 1 in which the carboxy functional siloxane consists essentially of from 0.5 to 20 mole % of $R_aR'_bSiO_{4-a-b/2}$ units and from 80 to 99.5 mole % of $R''_cSiO_{4-c/2}$ units wherein R is a carboxy functional radical,
R' is a hydrocarbon or substituted hydrocarbon radical,
R" is a hydrocarbon or substituted hydrocarbon radical,
a has an average value of from 1 to 3,
b has an average value of from 0 to 2,
a+b is from 1 to 3, and
c has an average value of from 0 to 3.

5. The B-side composition of claim 4 in which the carboxy functional silicone has the formula

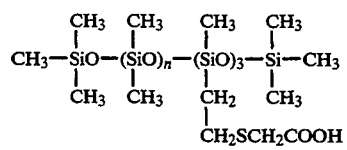

6. In an active hydrogen-containing B-side composition for reaction with a polyisocyanate-containing A-side composition to make a polyurethane, polyurethaneurea or polyurea elastomer by reaction injection molding, the improvement which comprises a mold release composition consisting essentially of the reaction product of triethylenediamine and a reactive epoxide which is propylene oxide or a monoglycidyl ether of a $C_{12}-C_{18}$ alcohol, the triethylenediamine and epoxide being reacted in the presence of a carboxy functional siloxane which consists essentially of from 0.5 to 20 mole % of $R_aR'_bSiO_{4-a-b/2}$ units and from 80 to 99.5 mole % of $R''_cSiO_{4-c/2}$ units wherein R is a carboxy functional radical,
R' is a hydrocarbon or substituted hydrocarbon radical,
R" is a hydrocarbon or substituted hydrocarbon radical,
a has an average value of from 1 to 3,
b has an average value of from 0 to 2,
a+b is from 1 to 3, and
c has an average value of from 0 to 3.

7. The B-side composition of claim 6 in which the epoxide is the monoglycidyl ether of lauryl alcohol.

8. The B-side composition of claim 7 in which the carboxy functional silicone has the formula

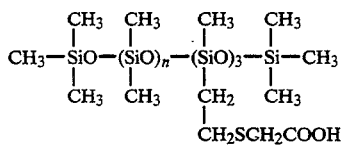

9. An internal mold release composition consisting essentially of the reaction product of triethylenediamine and a $C_2$–$C_{21}$ epoxide reacted in the presence of a carboxy functional siloxane.

10. The internal mold release composition of claim 9 in which the epoxide is ethylene oxide, propylene oxide, butylene oxide, styrene oxide, a glycidyl ether of a $C_{12}$–$C_{18}$ higher alcohol, a $C_2$–$C_{18}$ glycol or a bisphenol; a silicone containing epoxide, an epoxidized olefin or an epoxidized vegetable oil.

11. The internal mold release composition of claim 9 in which the epoxide is propylene oxide or a monoglycidyl ether of a $C_{12}$–$C_{18}$ alcohol.

12. The internal mold release composition of claim 9 in which the carboxy functional siloxane consists essentially of from 0.5 to 20 mole % of $R_aR'_bSiO_{4-a-b/2}$ units and from 80 to 99.5 mole % of $R''_cSiO_{4-c/2}$ units wherein R is a carboxy functional radical, R' is a hydrocarbon or substituted hydrocarbon radical, R" is a hydrocarbon or substituted hydrocarbon radical, a has an average value of from 1 to 3, b has an average value of from 0 to 2, a+b is from 1 to 3, and c has an average value of from 0 to 3.

13. The internal mold release composition of claim 12 in which the carboxy functional silicone has the formula

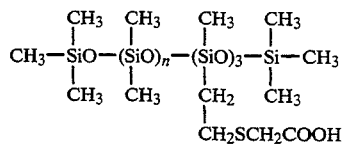

14. An internal mold release composition consisting essentially of the reaction product of triethylenediamine and a reactive epoxide which is propylene oxide or a monoglycidyl ether of a $C_{12}$–$C_{18}$ alcohol, the triethylenediamine and epoxide being reacted in the presence of a carboxy functional siloxane which consists essentially of from 0.5 to 20 mole % of $R_aR'_bSiO_{4-a-b/2}$ units and from 80 to 99.5 mole % of $R''_cSiO_{4-c/2}$ units wherein R is a carboxy functional radical, R' is a hydrocarbon or substituted hydrocarbon radical, R" is a hydrocarbon or substituted hydrocarbon radical, a has an average value of from 1 to 3, b has an average value of from 0 to 2, a+b is from 1 to 3, and c has an average value of from 0 to 3.

15. The internal mold release composition of claim 14 in which the epoxide is the monoglycidyl ether of lauryl alcohol.

16. The internal mold release composition of claim 14 in which the carboxy functional silicone has the formula

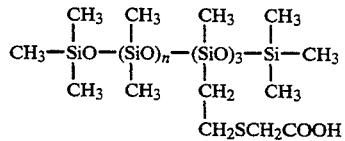

* * * * *